United States Patent
Akaike et al.

(10) Patent No.: US 10,300,825 B2
(45) Date of Patent: May 28, 2019

(54) TABLE APPARATUS FOR VEHICLE

(71) Applicant: TOYOTA BOSHOKU KABUSHIKI KAISHA, Aichi-ken (JP)

(72) Inventors: Fumitoshi Akaike, Aichi-ken (JP); Hiroshi Tsuji, Aichi-ken (JP); Yasuhiro Kato, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/980,869

(22) Filed: May 16, 2018

(65) Prior Publication Data

US 2018/0339630 A1  Nov. 29, 2018

(30) Foreign Application Priority Data

May 24, 2017  (JP) .................. 2017-102424

(51) Int. Cl.
*B60N 3/00* (2006.01)
*B60N 2/75* (2018.01)

(52) U.S. Cl.
CPC .............. *B60N 3/002* (2013.01); *B60N 2/79* (2018.02)

(58) Field of Classification Search
CPC ............ A47C 7/748; A47C 7/74; A47B 31/02
USPC ......... 108/50.13; 297/180.12, 180.13, 180.1, 297/142, 143, 144, 155
See application file for complete search history.

(56) References Cited

U.S. PATENT DOCUMENTS

| | | | | |
|---|---|---|---|---|
| 2,514,798 A * | 7/1950 | Rowe | .................. | B60N 2/34 297/102 |
| 4,258,706 A * | 3/1981 | Shank | .................. | A61H 1/00 297/180.12 |
| 4,958,576 A * | 9/1990 | Kauer | .................. | B60N 3/002 108/33 |
| 4,987,896 A * | 1/1991 | Nakamatsu | .............. | A47C 7/74 607/109 |
| 5,035,464 A * | 7/1991 | Spallholtz | ................ | A47C 7/62 297/144 |
| 5,129,702 A * | 7/1992 | Ervin | ..................... | A47B 83/02 108/49 |
| 6,793,281 B2 * | 9/2004 | Duerr | ..................... | B60N 3/002 297/147 |
| 8,020,808 B2 * | 9/2011 | Collins | .................. | B60N 3/002 244/118.5 |
| 8,359,982 B2 * | 1/2013 | Lebel | .................... | A47B 23/043 108/44 |
| 8,672,400 B2 * | 3/2014 | Henderson | ............. | B60N 3/002 297/160 |
| 9,826,827 B2 * | 11/2017 | Calderone | ............ | A47B 23/025 |

(Continued)

FOREIGN PATENT DOCUMENTS

JP        1-150034        10/1989

*Primary Examiner* — Jose V Chen
(74) *Attorney, Agent, or Firm* — Greenblum & Bernstein, P.L.C.

(57) ABSTRACT

A table apparatus for a vehicle including: a table having a substantially horizontal upper surface in a region directly above a seating surface of a vehicle seat; a heat source provided to the table and configured to perform heat radiation from a lower surface side of the table; and a table moving mechanism configured to move the table so as to change a position of the table with respect to the vehicle seat, wherein a position of the heat source with respect to the vehicle seat is changed by moving the table by the table moving mechanism.

4 Claims, 19 Drawing Sheets

(56) References Cited

U.S. PATENT DOCUMENTS

| | | | |
|---|---|---|---|
| 9,896,011 B2* | 2/2018 | Kong | B60N 3/002 |
| 2008/0149770 A1* | 6/2008 | Hoffjann | B64D 11/06 |
| | | | 244/122 R |
| 2010/0207431 A1* | 8/2010 | Petzel | B60N 2/5621 |
| | | | 297/180.16 |
| 2010/0301640 A1* | 12/2010 | Heiser | A47C 1/06 |
| | | | 297/135 |
| 2014/0152057 A1* | 6/2014 | Truant | B60N 2/879 |
| | | | 297/180.12 |
| 2016/0003882 A1* | 1/2016 | Loftus | G01R 31/007 |
| | | | 324/750.11 |
| 2018/0271287 A1* | 9/2018 | Jacobs | A47C 1/12 |

* cited by examiner

TABLE APPARATUS FOR VEHICLE

CROSS-REFERENCE TO RELATED APPLICATIONS

This application claims priority from Japanese Patent Application No. 2017-102424 filed on May 24, 2017, the entire contents of which are incorporated herein by reference.

TECHNICAL FIELD

The disclosure relates to a table apparatus for a vehicle. More particularly, the disclosure relates to the table apparatus for a vehicle including a table having a substantially horizontal upper surface in a region directly above a seating surface of a vehicle seat.

BACKGROUND

As a table apparatus for a vehicle, there has been known a configuration in which a table that can be used as a small tray is provided so as to project laterally from an armrest provided on a seat side portion towards a front portion of a seated person (JP-UM-A-H1-150034). A back surface portion of the table is equipped with a heater so that warm heat generated from the heater is applied to knees of the seated person.

In the above-described conventional techniques, since warm heat is generated only in a specific direction from a heater on a back of a table, there is a possibility that the warm heat cannot be applied to an appropriate position or distance depending on a physique and posture of a seated person.

SUMMARY

The disclosure has been made to solve the above problems, and the problems to be solved by the disclosure are to make it possible to appropriately change a use position of a heat source attached to the table.

According to an aspect of the disclosure, there is provided a table apparatus for a vehicle, the table apparatus including: a table having a substantially horizontal upper surface in a region directly above a seating surface of a vehicle seat; a heat source provided to the table and configured to perform heat radiation from a lower surface side of the table; and a table moving mechanism configured to move the table so as to change a position of the table with respect to the vehicle seat, wherein a position of the heat source with respect to the vehicle seat is changed by moving the table by the table moving mechanism.

Accordingly, by changing the position of the table with respect to the vehicle seat by the table moving mechanism, it is possible to change the position of the heat source which performs the heat radiation from the lower surface side of the table. In this way, by using the mechanism for moving the table, it is possible to appropriately change the use position of the heat source attached to the table by moving the table for a purpose different from the purpose for changing a use position of the table.

DETAILED DESCRIPTION

Hereinafter, an embodiment of the disclosure will be described with reference to the drawings.

Embodiment 1

Schematic Configuration of Table Apparatus 1

First, a configuration of a table apparatus 1 (table apparatus for a vehicle) of a first embodiment will be described with reference to FIGS. 1 to 19. In the following description, directions including front and rear, upper and lower, and right and left refer to the respective directions shown in each of the drawings. In addition, a "seat width direction" refers to a right-left direction of a seat 100 described below, a "seat height direction" refers to an upper-lower direction of the seat 100, and a "seat front-rear direction" refers to a front-rear direction of the seat 100.

Figure 1:
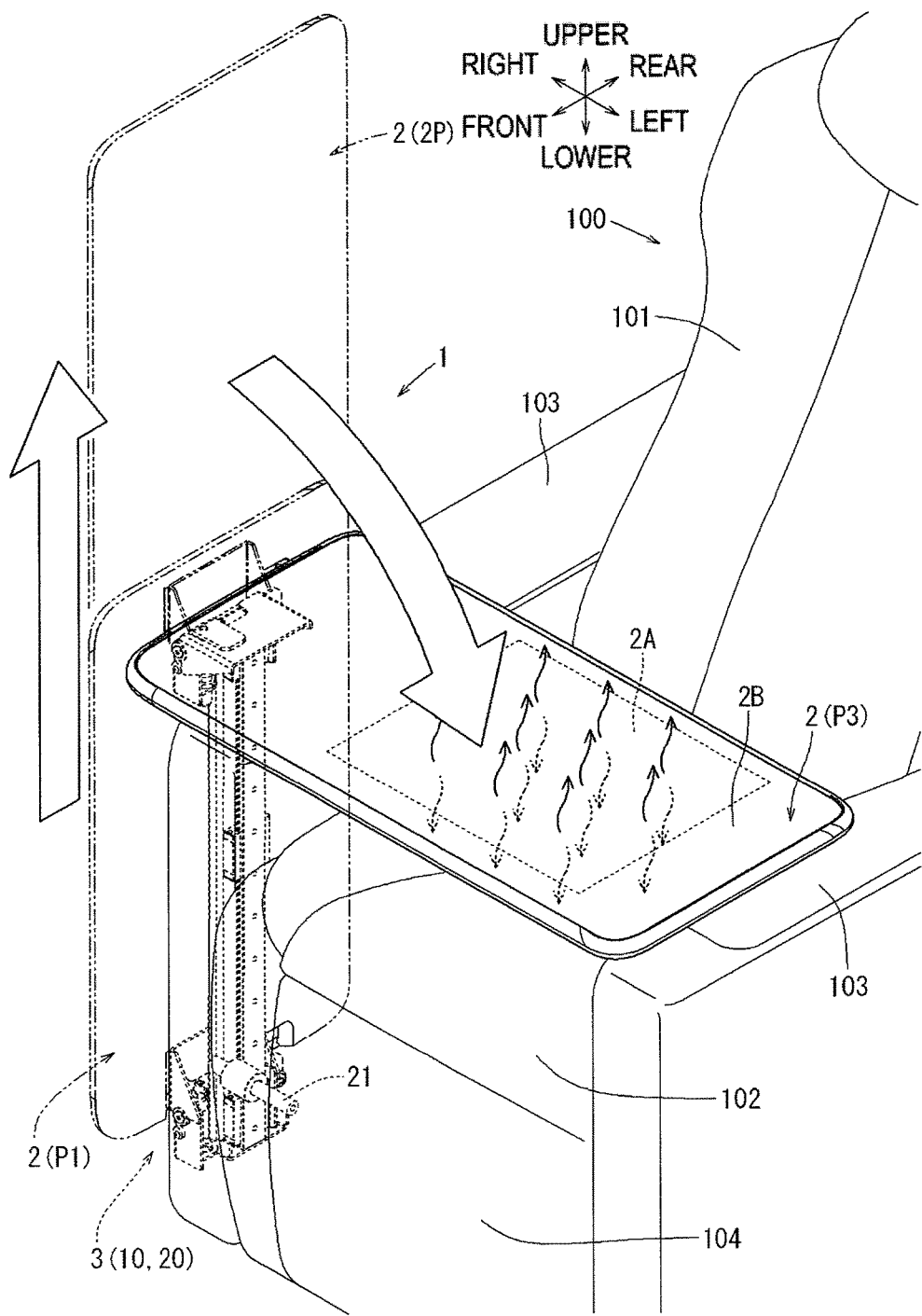
FIG. 1 is a perspective view illustrating a schematic configuration of a table apparatus for a vehicle of a first embodiment.

As shown in FIG. 1, the table apparatus 1 of the embodiment is mounted on a seat 100 provided as a left rear seat of an automobile. Specifically, the table apparatus 1 includes a flat plate-shaped table 2 serving as a small tray and a table moving mechanism 3 allowing the table 2 to move so as to be deployed and housed with respect to the seat 100. The table moving mechanism 3 firstly moves the table 2 from a housed position P1 (see FIG. 6) for storing in a vertically elongated shape along a right side portion of the seat 100, to a pulled-up position P2 (see FIG. 7) for pulling straight upward by an electric operation caused by a predetermined switch operation. The table moving mechanism 3 then allows the table 2, which is pulled up to the pulled-up position P2 (see FIG. 7), to be deployed to a deployed position P3 (see FIG. 8) in which the table 2 is laterally pushed down horizontally in a region directly above a seating surface located above the knees of a seated person (a region directly above a seat cushion 102 described below) by a manual turning down operation.

As shown in FIG. 1, by the deployment to the deployed position P3, the table 2 is switched to be in an available state where small articles can be placed on a substantially horizontal upper surface of the table. In addition, the table 2 includes a panel heater 2A embedded therein so as to radiate warm heat from radiation heat towards both knees of the seated person from a lower surface side of the table 2 by the deployment to the deployed position P3. The panel heater 2A corresponds to a "heat source" of the disclosure.

In detail, the table 2 is deployed in a manner of being spanned between upper surface portions of upright plate-shaped armrests 103 erected on both the right and left side portions of the seat 100. The panel heater 2A embedded in the table 2 is deployed into a state where the surface faces widely between the right and left armrests 103 by the deployment of the table 2, which enables the warm heat to be radiated from above across a wide range in the seat width direction towards both knees of the seated person.

In addition, the table 2 includes a heat transfer structure 2B in which the warm heat radiated from the panel heater 2A can be also radiated from an upper surface side of the table 2. Specifically, the table 2 is made of an aluminum plate material having high heat conductivity, and intensity of heat insulating effect with a heat insulating layer (not illustrated) set inside is controlled. Accordingly, moderately warm heat is transferred to the upper surface, and the warm heat generated thereby is radiated also from the upper surface side towards the outside.

Figure 2:
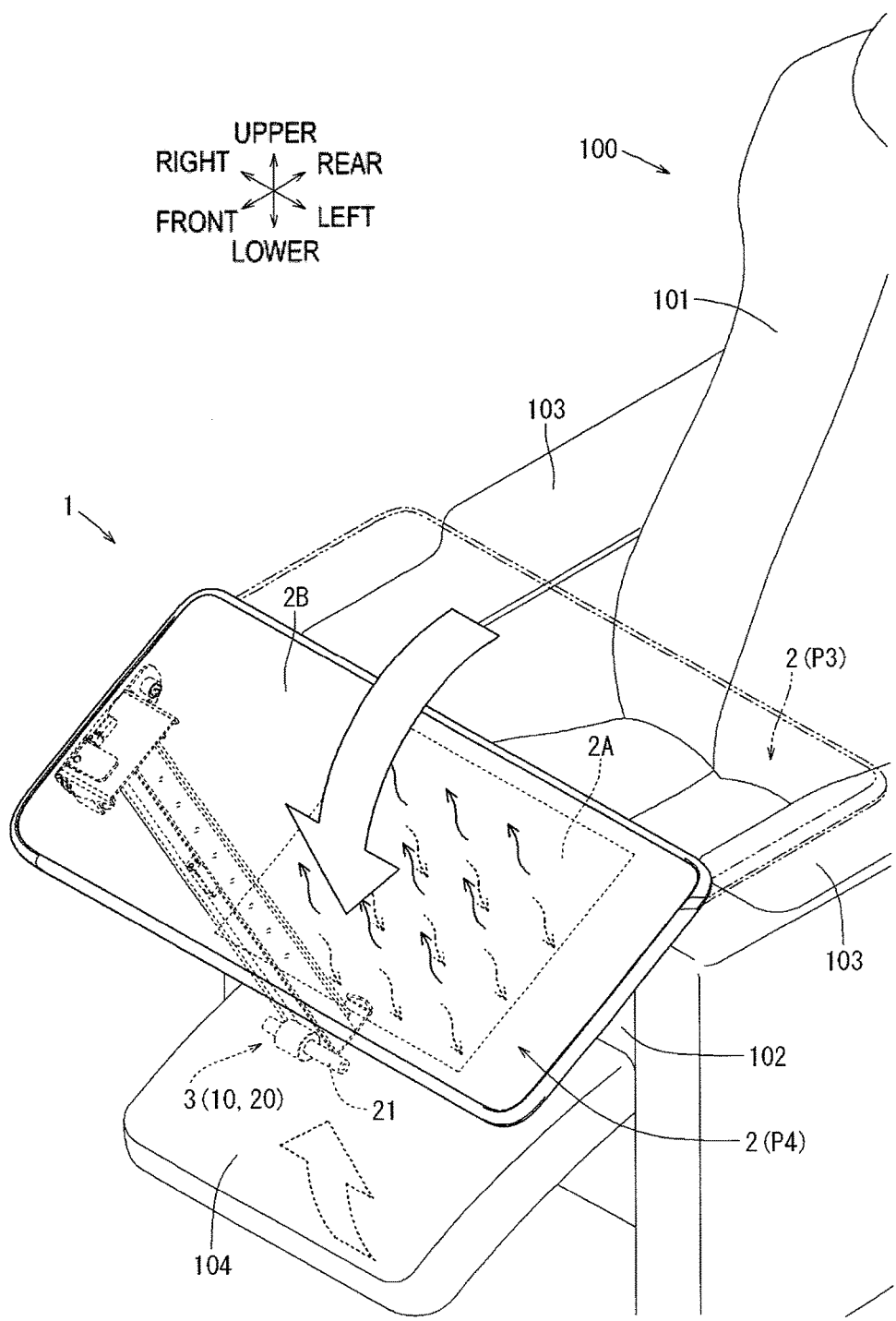
FIG. 2 is a perspective view illustrating a state where a deployed table is turned down to a front side of knees of a seated person.
Figure 9:
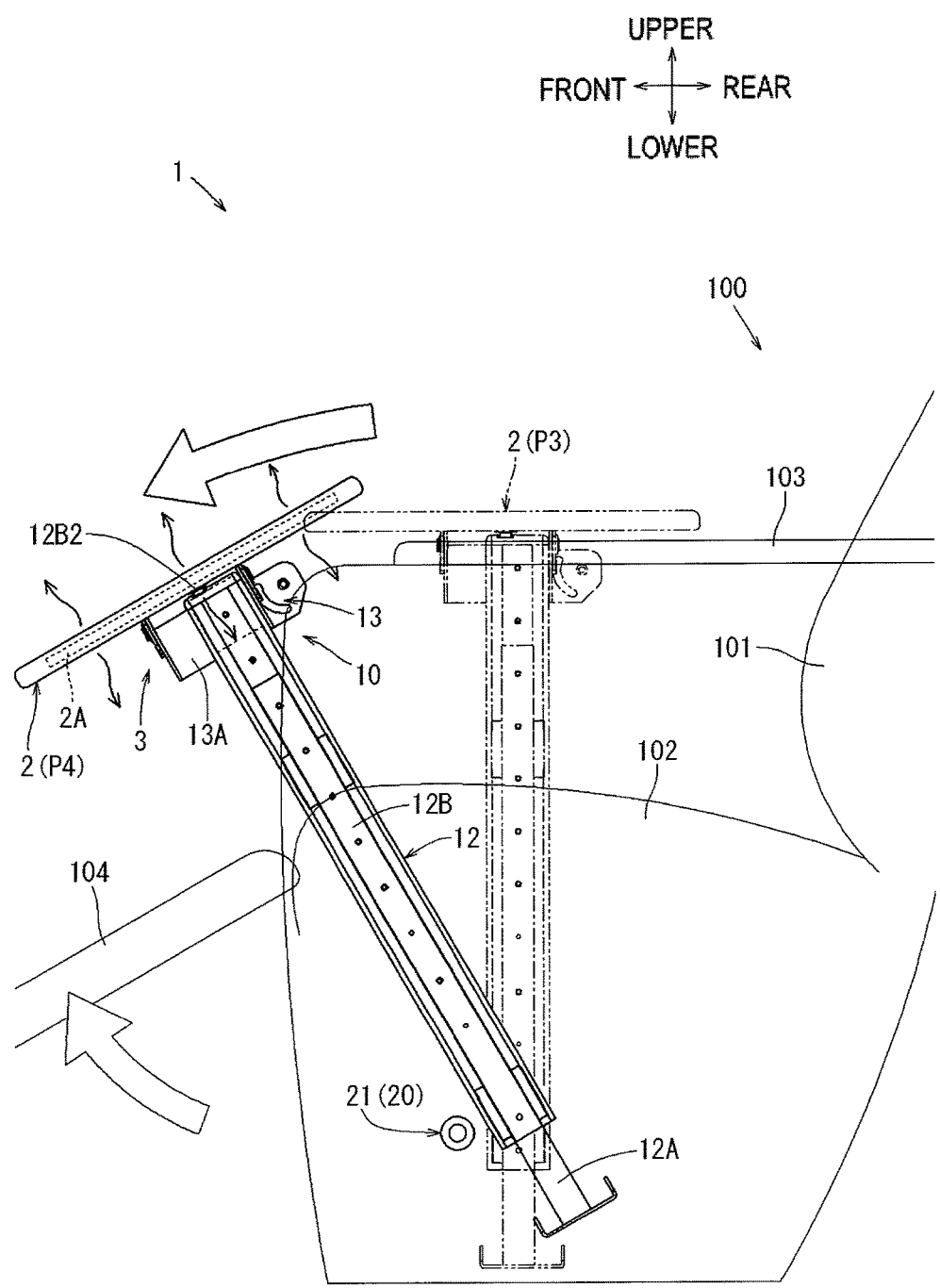
FIG. 9 is a side view illustrating a state where the deployed table is turned down to the front side of the knees of the seated person.

As shown in FIG. 2 and FIG. 9, the table moving mechanism 3 enables the table 2 which is deployed to the deployed position P3 to be further rotated around a rotary shaft 21, in which an axis is directed to the seat width direction and set at a front lower position of the right armrest 103, in a manner of turning down to a front lower side by the electric operation caused by the predetermined switch operation. The rotary shaft 21 corresponds to a "shaft center" of the disclosure. By this rotation, the table 2 is inclined in a manner of turning down to a front side of the seat cushion 102 serving as a seating portion of the seat 100 and is switched to a state of a forward tilting position P4 in which a lower surface of the table is directed to lower leg portions of the seated person. In the above state, while the table 2 is placed in an unusable state where the upper surface thereof is inclined downwardly in the forward direction and results in being unusable as the small tray, the table 2 is in a state where the warm heat can be radiated from the lower surface side towards both lower leg portions of the seated person by the panel heater 2A.

In such cases, as shown in these drawings, by switching an ottoman 104 which is a footrest of the seat 100 to a relaxed posture state of being pushed out to the front side of the seat cushion 102, the warm heat radiated from the lower surface side of the table 2 which is switched to the forward tilting position P4 can be effectively applied to both lower leg portions of the seated person who puts feet on the ottoman 104. The forward tilting position P4 of the table 2 can be adjusted to an appropriate position by the electric operation caused by the predetermined switch operation.

Figure 3:
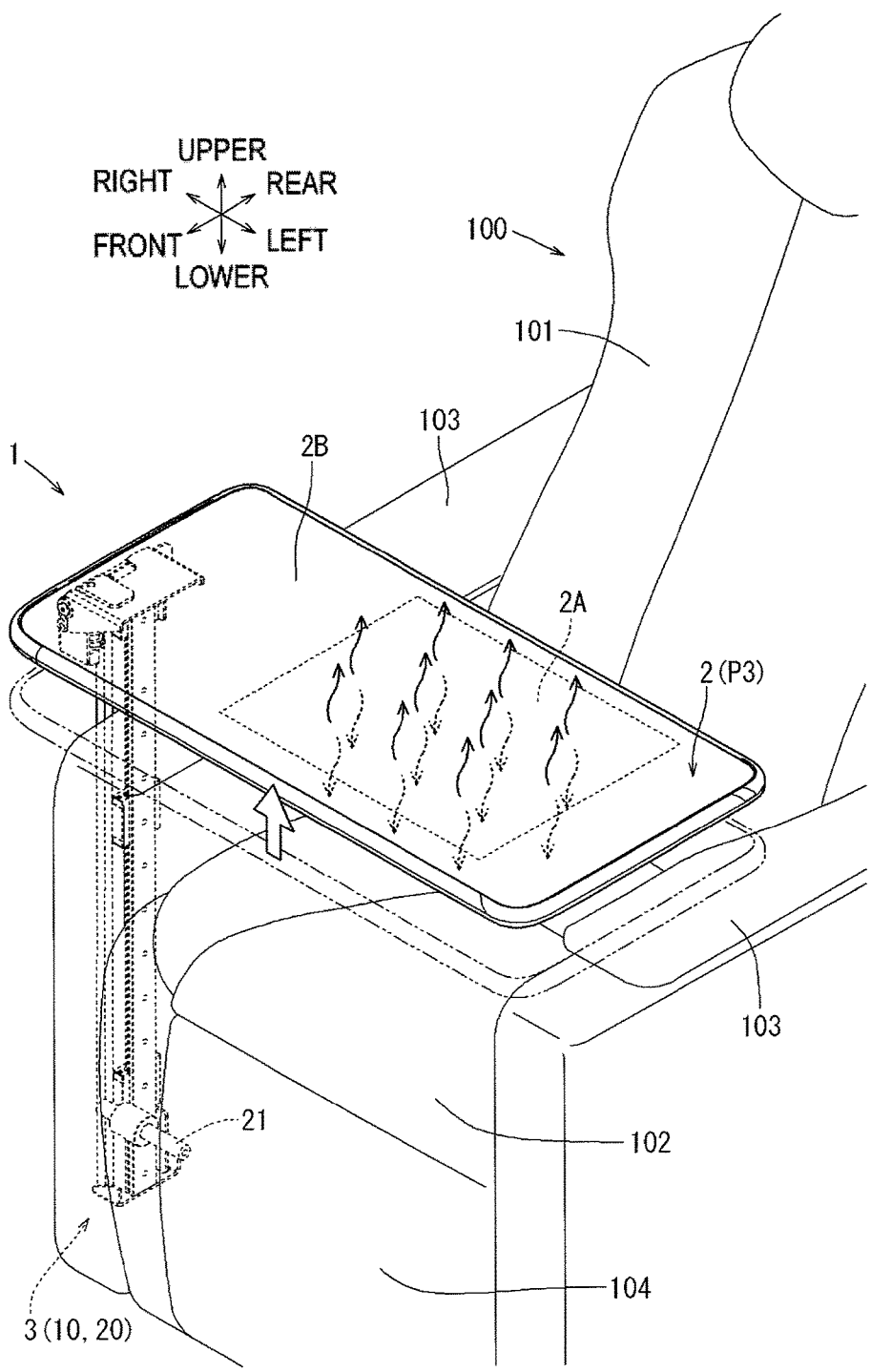
FIG. 3 is a perspective view illustrating a state where height of the deployed table is raised.

In addition, as shown in FIG. 3, the table moving mechanism 3 can further move the table 2 which is deployed to the deployed position P3 in a manner to raise and lower the table 2 with respect to the right armrest 103 by the electric operation caused by the predetermined switch operation. With the above movement, distance between the table 2 and both knees of the seated person in the seat height direction can be increased or decreased, and a use position of the table 2 can be changed, as well as the intensity of the radiation heat radiated from the lower surface side of the table 2 can be adjusted.

Figure 4:
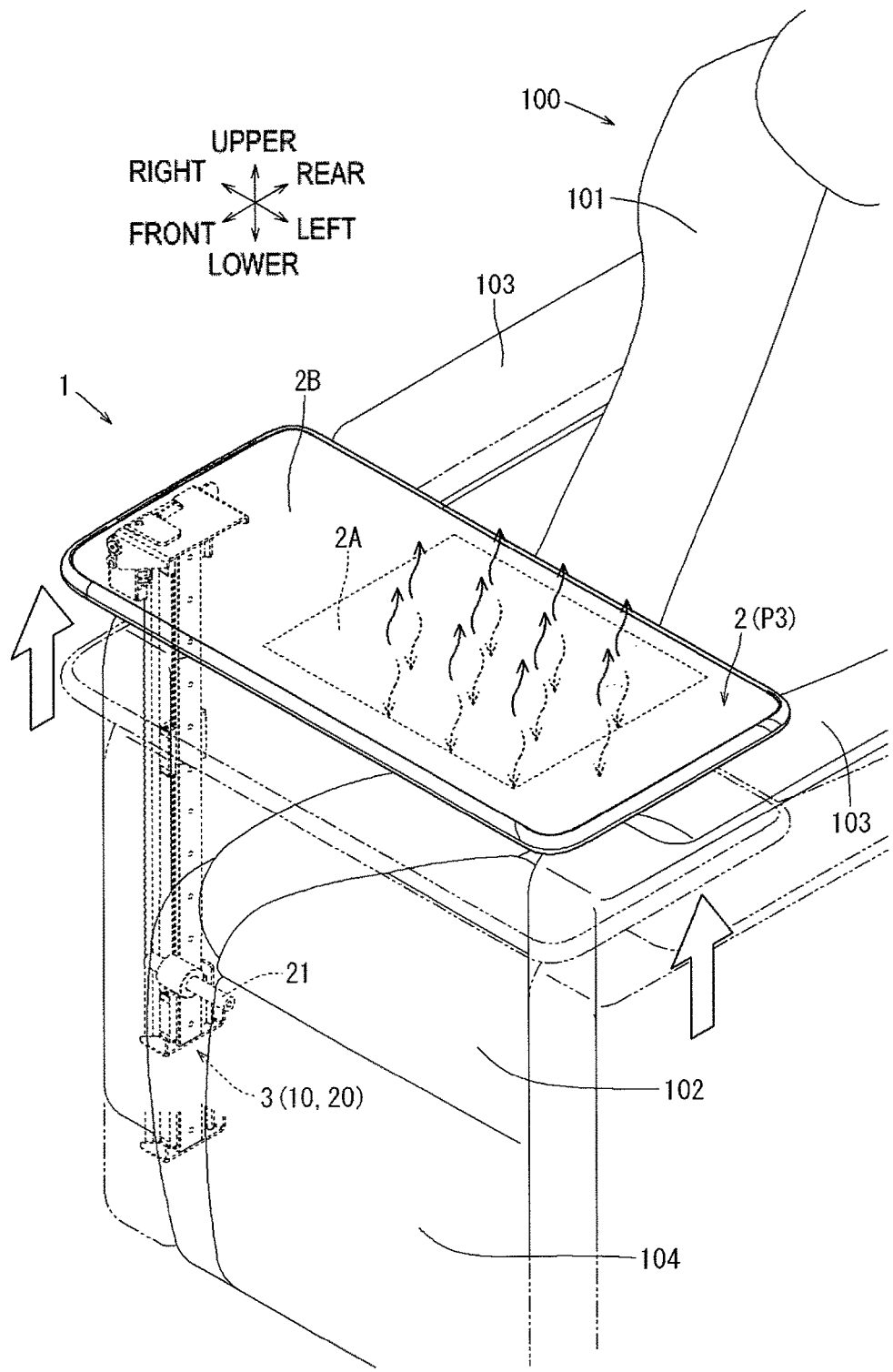
FIG. 4 is a perspective view illustrating a state where the height of the deployed table is raised by raising an armrest.
Figure 10:
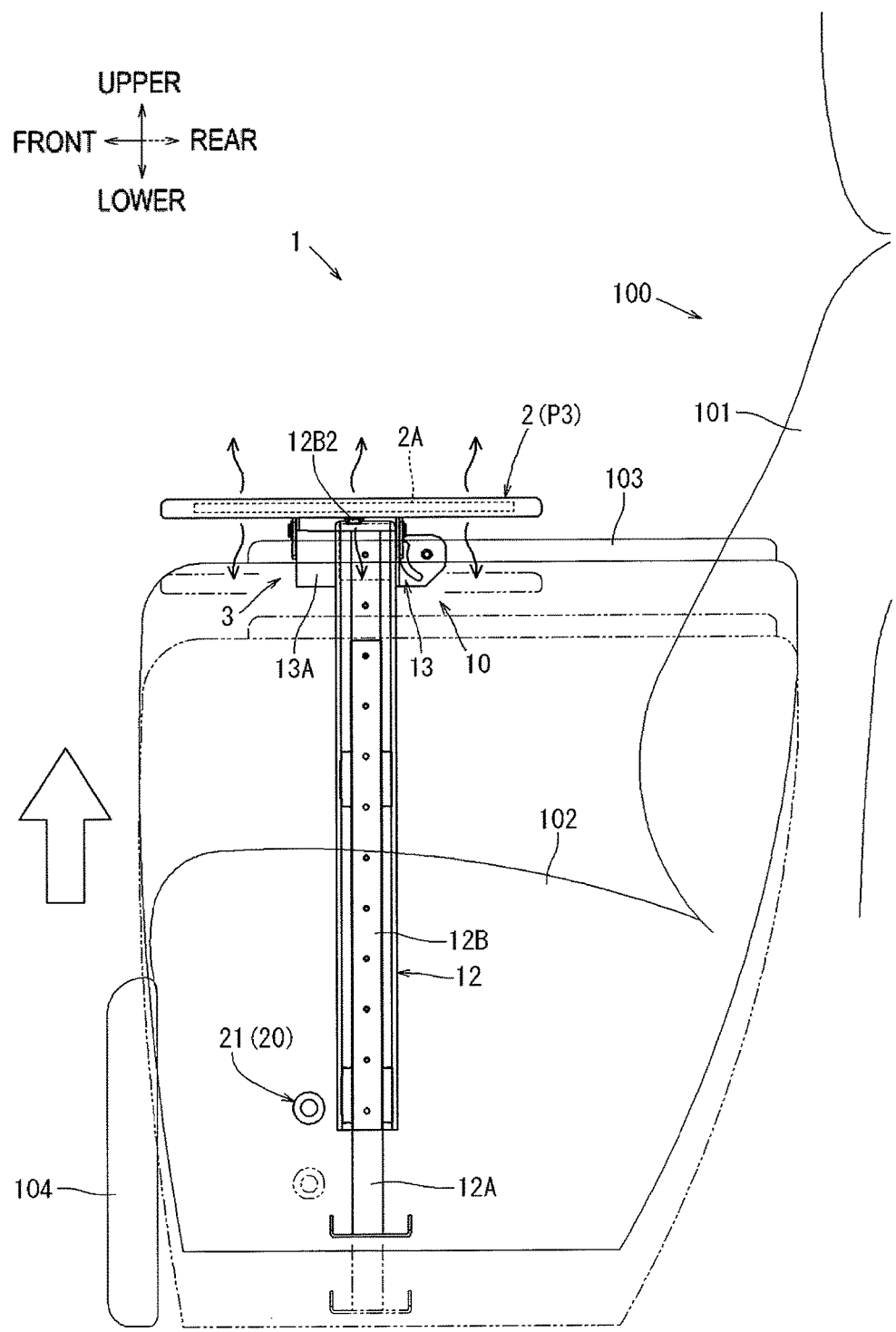
FIG. 10 is a perspective view illustrating a state where the height of the deployed table is raised by raising the armrest.

The table moving mechanism 3 has a structure where the table 2 is connected so as to be moved in the seat height direction with respect to the right armrest 103. As shown in FIG. 4, the right armrest 103 can adjust the position in the height direction with respect to the seat 100 by the electric operation caused by the predetermined switch operation together with the left armrest 103. With the above configuration, as shown in FIG. 4 and FIG. 10, by raising and lowering the right and left armrests 103 with respect to the seat 100, the position of the table 2 in the height direction with respect to the seat 100 can be adjusted integrally with the right armrest 103 without operating the table moving mechanism 3.

Figure 5:
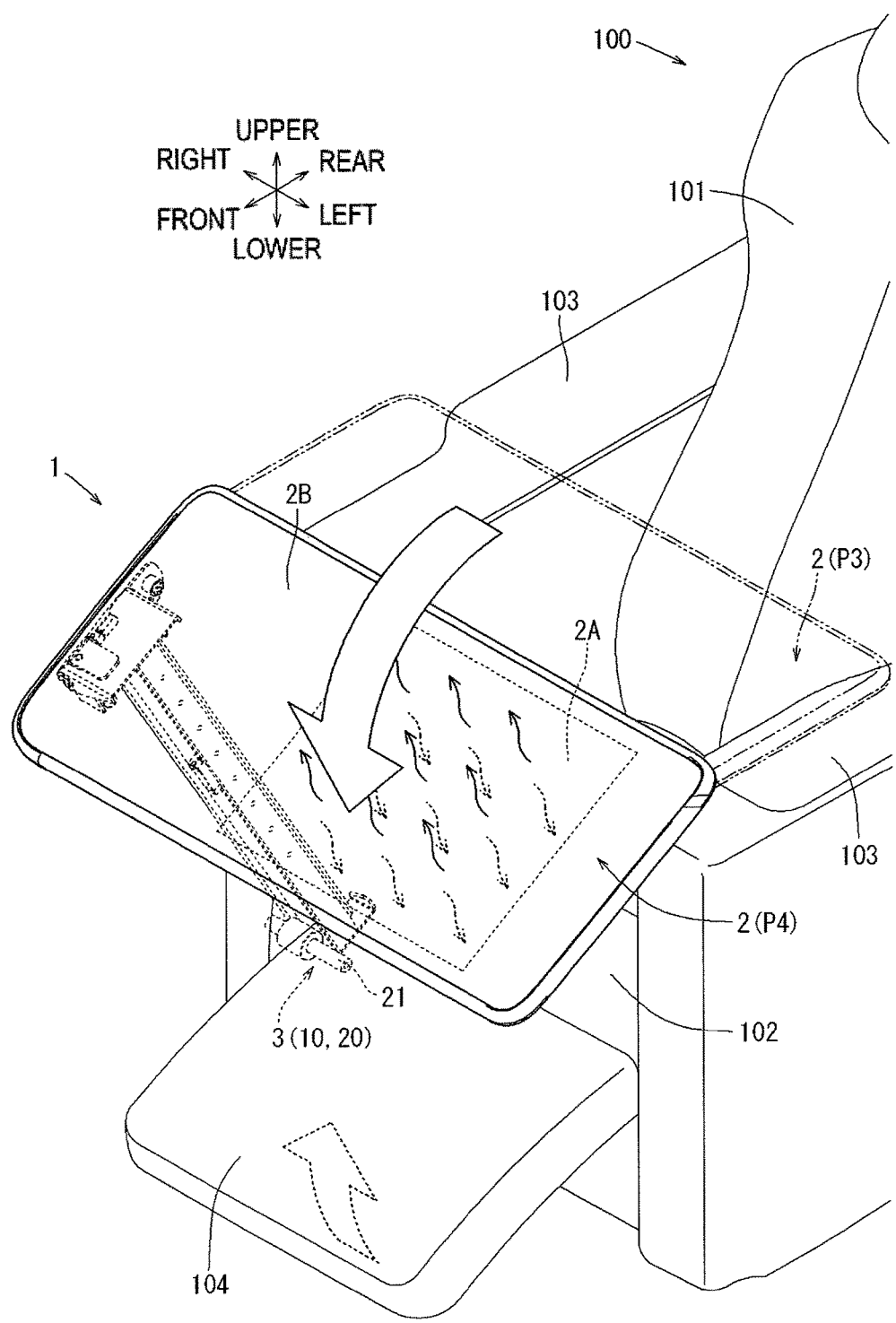
FIG. 5 is a perspective view illustrating a state where the table is turned down to the front side of the knees of the seated person from a position where the armrest is raised.

As shown in FIG. 5, the table moving mechanism 3 enables the table to be further rotated around the rotary shaft 21 being set at the front lower position of the right armrest 103 in a manner of turning down to the front lower side by the electric operation caused by the predetermined switch operation, as with the state illustrated in FIG. 2, even when the position of the table 2 which is deployed to the deployed position P3 is raised in the seat height direction. With the above configuration, in a case where a physique of the seated person is relatively large, or in a case where it is desired to use the weakened warm heat, by rotating the table 2 forward from a state of being used at a higher position, the table 2 is switched to a state of the forward tilting position P4 at a higher position corresponding to the higher position of the table. Therefore, the table 2 can be switched to the forward tilting position P4 while maintaining the state corresponding to the physique of the seated person and a preference of warm heat intensity.

Configuration of Seat 100

Hereinafter, a specific configuration of the table apparatus 1 will be described in detail in conjunction with a basic configuration of the seat 100. First, the basic configuration of the seat 100 will be described. As shown in FIG. 1, the seat 100 includes a seat back 101 serving as a backrest portion of the seated person, the seat cushion 102 serving as the seating portion, a pair of right and left armrests 103 serving as elbow rests, and the ottoman 104 serving as a footrest.

A lower end portion of both right and left sides of the seat back 101 is connected to a rear end portion of both the right and left sides of the seat cushion 102 such that a backrest angle can be adjusted via a recliner (not illustrated). The seat cushion 102 is connected to a floor of the vehicle such that a position of the seat in the front-rear direction can be adjusted through a pair of right and left slide rails 12 (not illustrated). The armrest 103 is connected to both the right and left side portions of the seat cushion 102 such that the position of the seat in the height direction can be adjusted via a lifter mechanism (not illustrated). The ottoman 104 is connected to a front portion of the seat cushion 102 so as to be deployed and housed via a drive mechanism (not illustrated).

Configuration of Table Moving Mechanism 3

Next, a configuration of the table moving mechanism 3 will be described. The table moving mechanism 3 has a structure including an upper-lower movement mechanism 10 in which the table 2 is connected so as to be moved in the seat height direction with respect to the right armrest 103 and including a front-rear rotation mechanism 20 in which the table 2 is connected so as to be rotated in the seat front-rear direction around the rotary shaft 21 in which the axis is directed to the seat width direction with respect to the right armrest 103. The front-rear rotation mechanism 20 corresponds to the "front-rear rotation mechanism" and the "front-rear movement mechanism" of the disclosure.

Configuration of Upper-Lower Movement Mechanism 10

Figure 11:
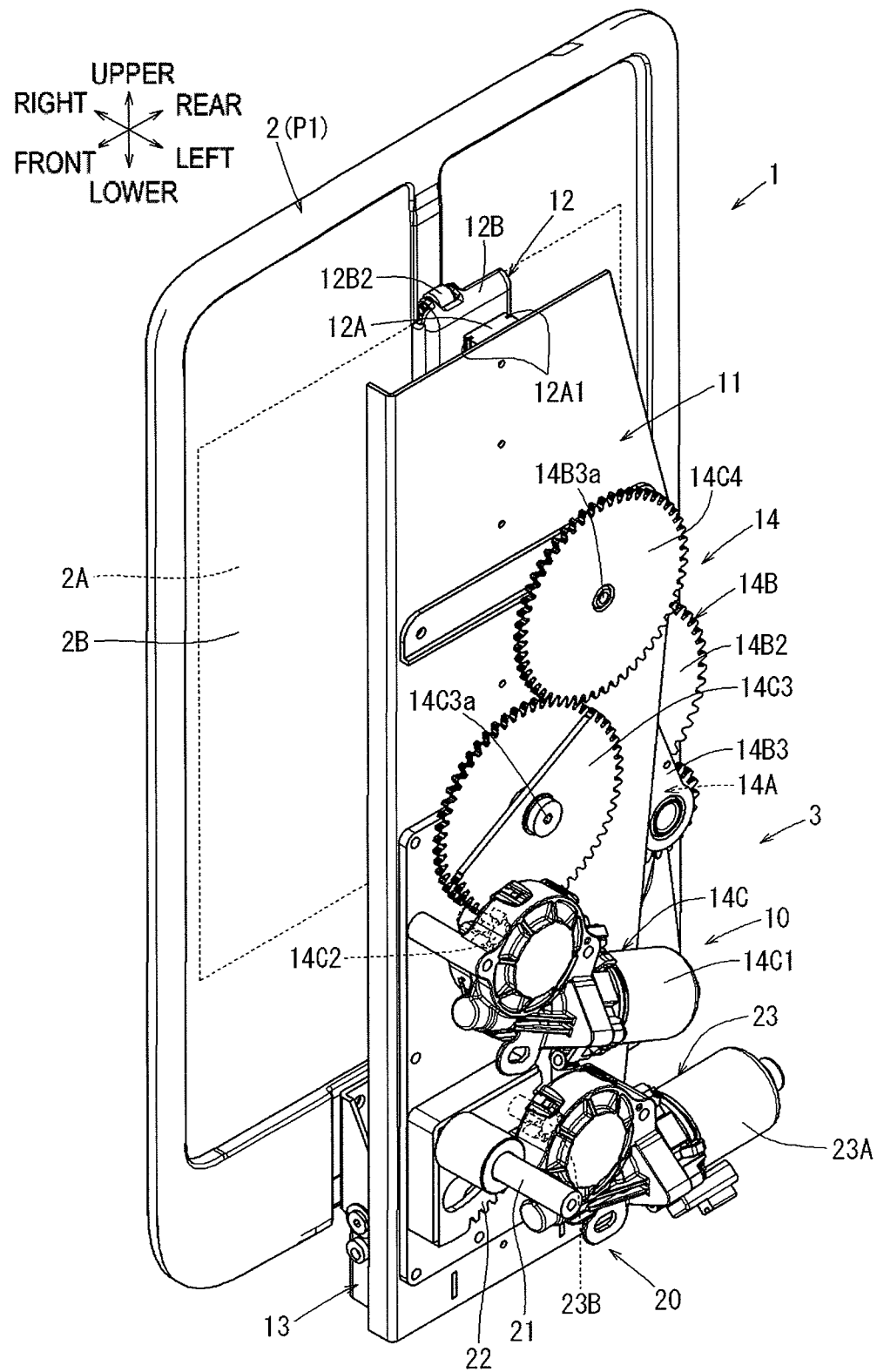
FIG. 11 is a perspective view of a table moving mechanism.
Figure 12:
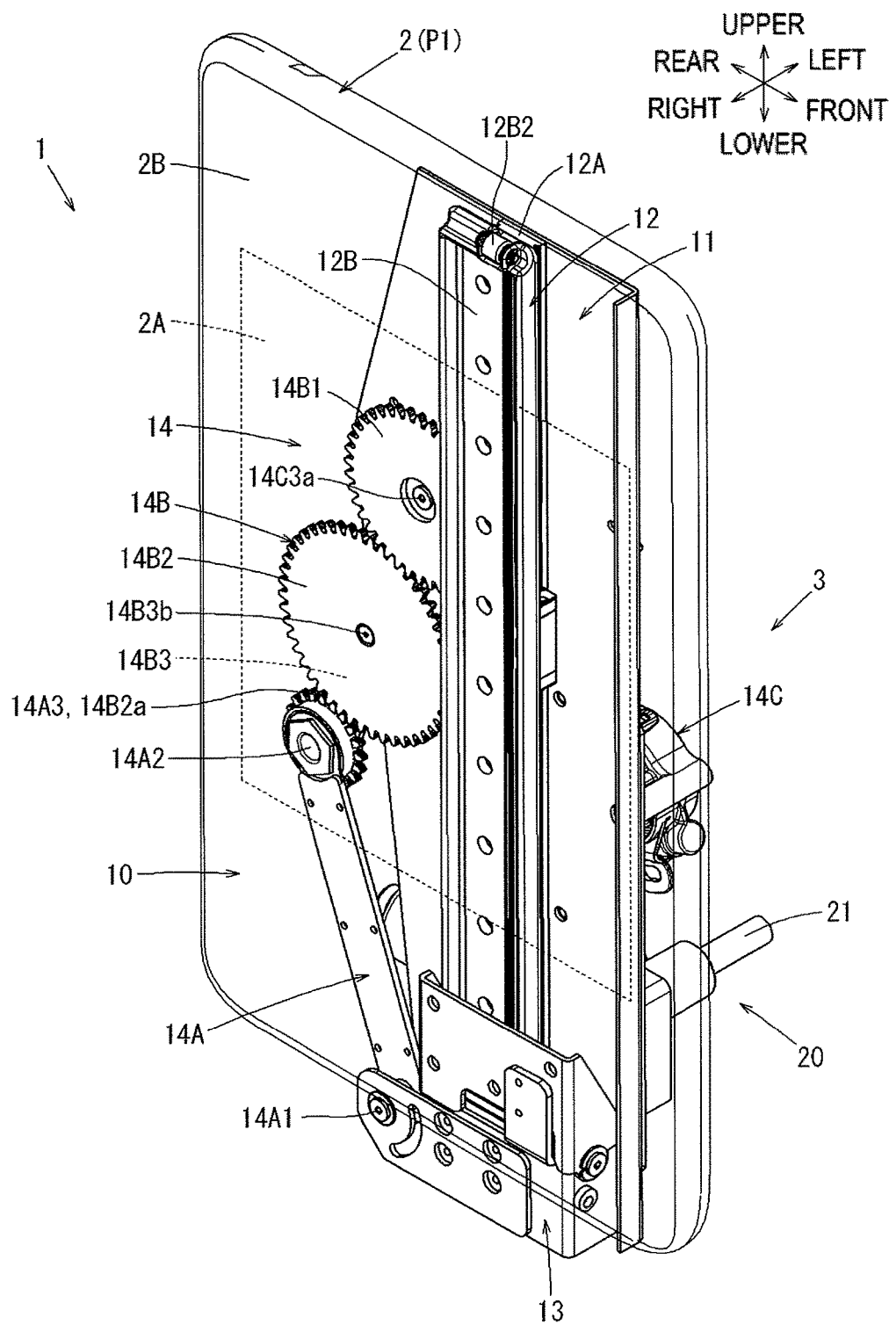
FIG. 12 is a perspective view as viewed from an opposite side to the side in FIG. 11.
Figure 13:
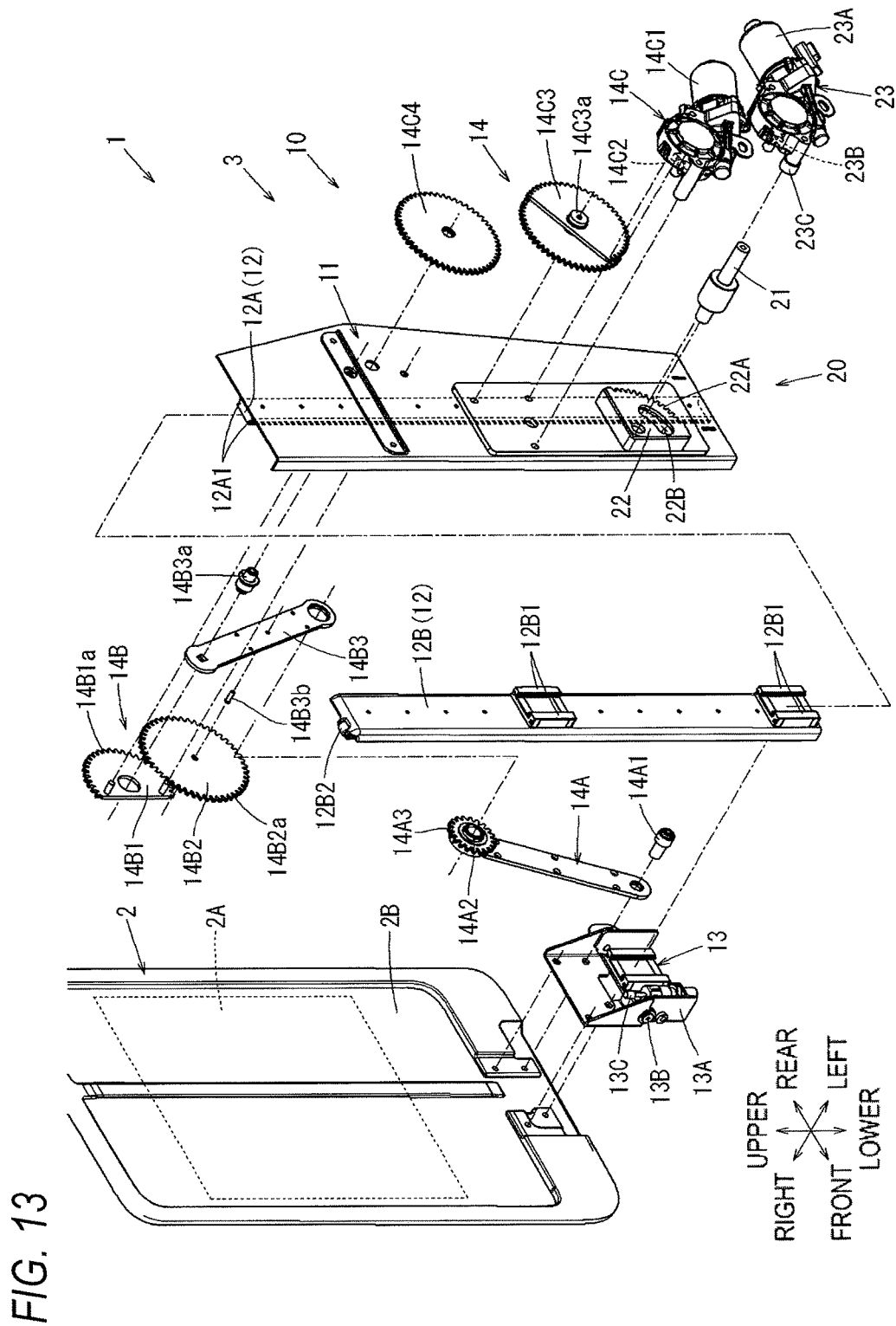
FIG. 13 is an exploded perspective view of the table moving mechanism.

As shown in FIGS. 11 to 13, the upper-lower movement mechanism 10 includes a flat plate-shaped base plate 11 in which an surface is directed to the seat width direction, the slide rails 12 extending straight in the seat height direction assembled with the base plate 11, a slider 13 guided so as to be slidable in the seat height direction along the slide rails 12, and an electrically driven feed mechanism 14 which slidingly operates the slider 13 in the seat height direction with respect to the base plate 11.

The base plate 11 is connected to the right armrest 103 illustrated in FIG. 1 via the front-rear rotation mechanism 20 described below and is provided so as to rotate around the rotary shaft 21 with respect to the right armrest 103 by driving the front-rear rotation mechanism 20. As shown in FIG. 13, the slide rail 12 includes a fixed side rail 12A provided in a state of being integrally fixed to the base plate 11 and extending in an elongated shape in the seat height direction, and a movable side rail 12B assembled in a guided state so as to be slidable in the seat height direction with respect to the fixed side rail 12A.

Figure 6:
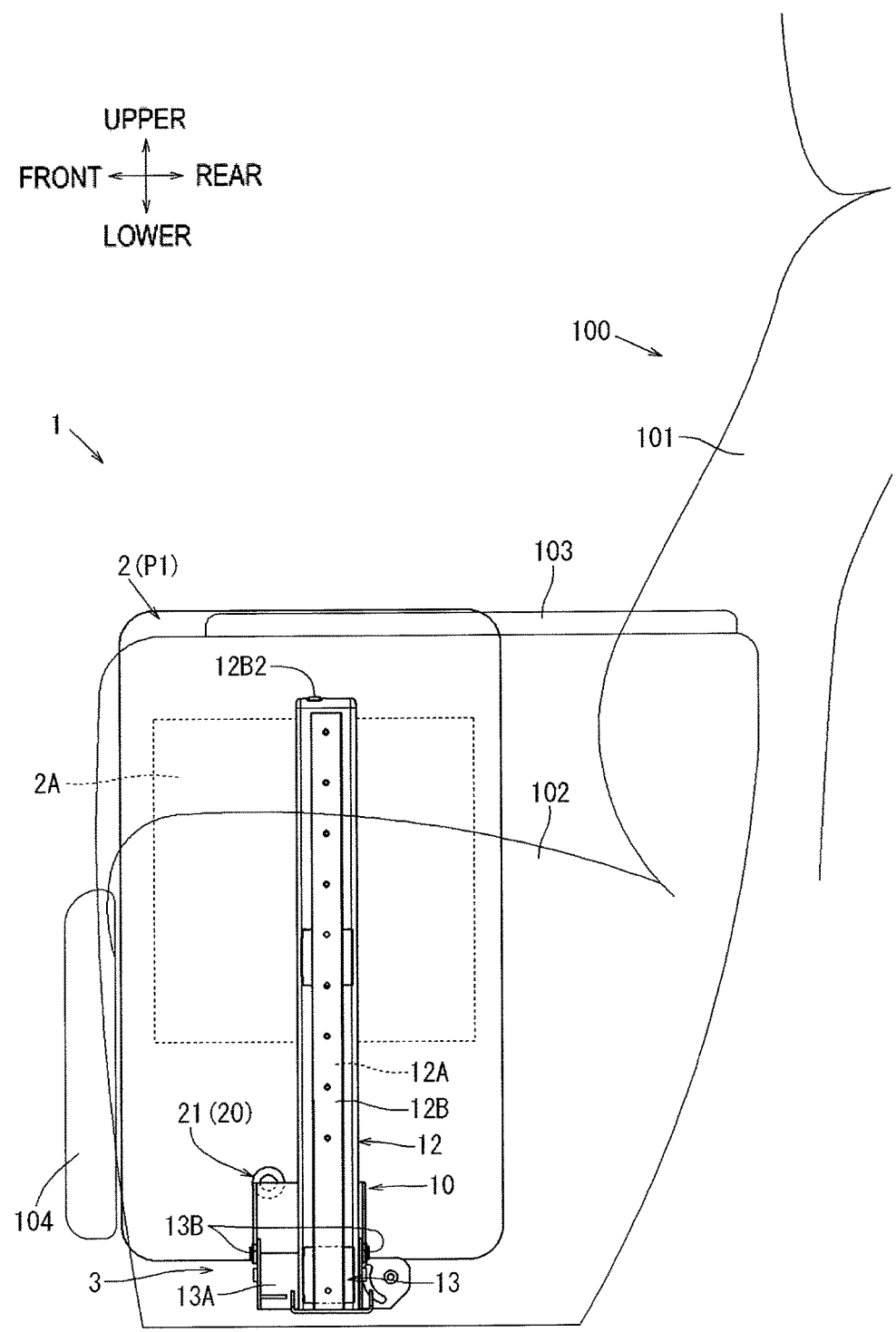
FIG. 6 is a side view illustrating a housed state of the table.

As shown in FIG. 6, the fixed side rail 12A and the movable side rail 12B are approximately equal to each other in rail length in the seat height direction and have a length falling within the shape in the seat height direction of the armrest 103. The fixed side rail 12A is provided so as to be housed at a position lower than an upper surface of the armrest 103 when being assembled with the right armrest 103 shown in FIG. 6 via the base plate 11 illustrated in FIGS. 11 to 13.

As shown in FIG. 13, the movable side rail 12B which is assembled to be slidable in the seat height direction with respect to the fixed side rail 12A is assembled in the guided state so as to be slidable only in the seat height direction along the fixed side rail 12A, by inserting each fitting portion 12B1 which is integrally attached to two positions of an intermediate portion and a lower end portion in the seat height direction from the upper side so as to fit respectively into each guide groove 12A1 recessed in a shape extending in a stripe shape in the seat height direction along the side portion of front and rear side of the fixed side rail 12A.

Figure 16:
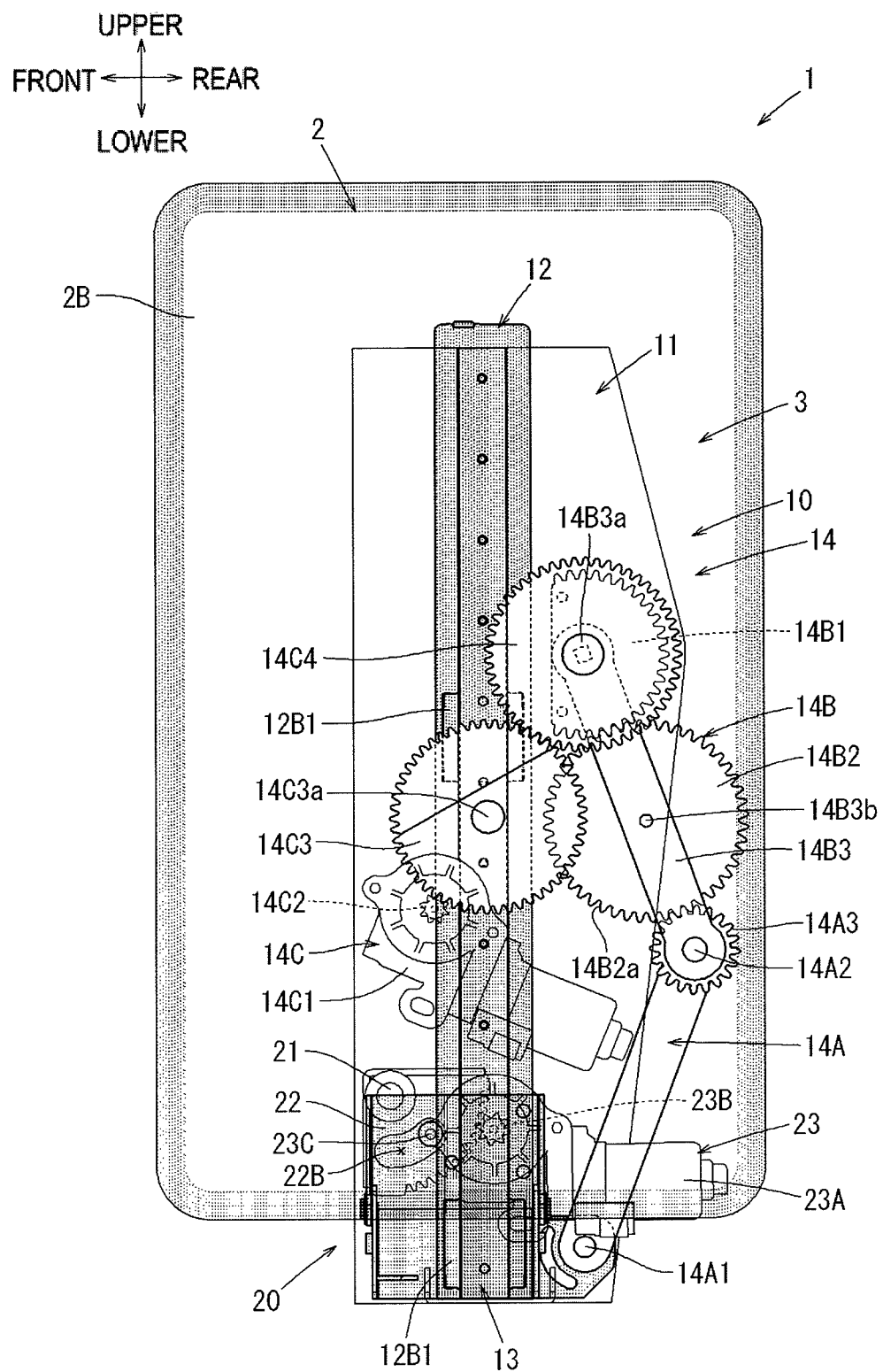
FIG. 16 is a side view illustrating a configuration of the table moving mechanism in the housed state of the table.
Figure 18:
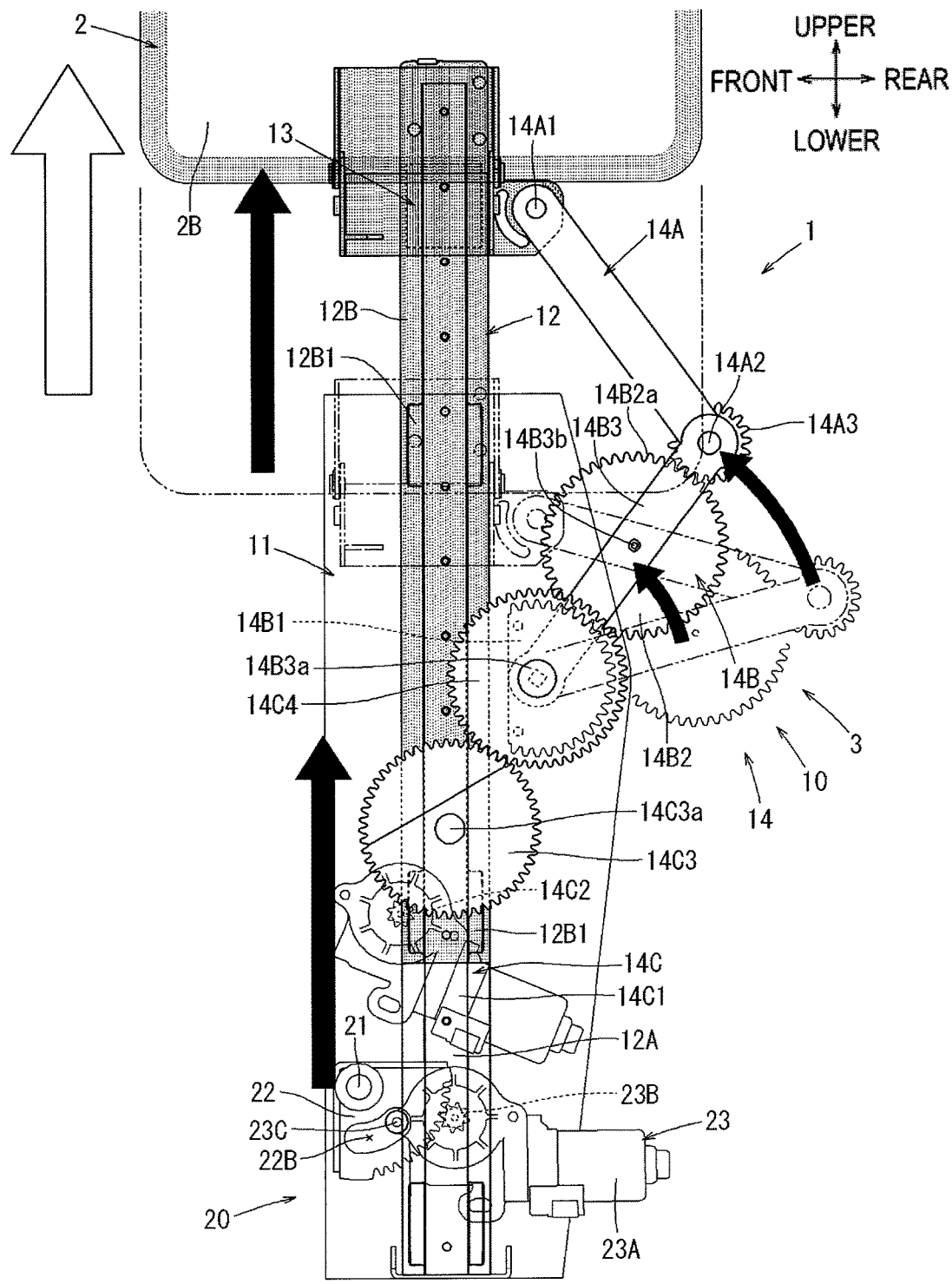
FIG. 18 is a side view illustrating a state where the table is further pulled up and the movable side rail is pulled up while sliding against a fixed side rail.

With the above assembly, the movable side rail 12B can slide in the seat height direction with respect to the fixed side rail 12A by the upper-lower movement of the slider 13 resulting from an operation of the feed mechanism 14 described below between a lowermost position where the fitting portion 12B1 on a lower end side of the movable side rail 12B is bottomed at the lower end of the fixed side rail 12A as shown in FIG. 16, and an uppermost position where the fitting portion 12B1 assembled at the intermediate portion in the seat height direction of the movable side rail 12B approaches an upper end of the fixed side rail 12A as shown in FIG. 18. With the above configuration, while maintaining a state where the two fitting portions 12B1 of the movable side rail 12B are fitted to the fixed side rail 12A, the slide rails 12 can increase and decrease the rail length in the seat height direction by overlapping or shifting the movable side rail 12B in the seat height direction with respect to the fixed side rail 12A. As shown in FIG. 13, an upper end portion of the movable side rail 12B is assembled with a roller 12B2 which reduces sliding friction due to interference with the table 2 when the table 2 is laterally pushed down from the pulled-up position or raised from a laterally pushed down position.

The slider 13 is assembled in the guided state so as to be slidable only in the seat height direction with respect to the movable side rail 12B. Specifically, by being inserted from a lower side so as to be fitted into a rail shape of the movable side rail 12B, the slider 13 is assembled in the guided state so as to be slidable only in the seat height direction with respect to the movable side rail 12B within a range from the lower end side of the movable side rail 12B to the position in which the slider 13 contacts the upper end to be locked.

The table 2 is integrally assembled with the slider 13 via a bracket 13A. A hinge shaft 13B in which the axis is directed to the seat front-rear direction is set in an intermediate portion of the bracket 13A. The rotation about the hinge shaft 13B allows switching between a state where the table 2 is straightly erected in the seat height direction as illustrated by virtual lines in FIG. 1, and a state where the table 2 is fallen horizontally towards an inner side of the seat width direction as illustrated by solid lines in FIG. 1. As shown in FIG. 13, the bracket 13A is assembled with a damper 13C which can buffer the table 2 so that speed is not excessively increased when the table 2 is turned down from an erected state to a fallen state.

The slider 13 is operated to move in the seat height direction along the movable side rail 12B resulting from an operation of the feed mechanism 14 described below by being assembled with the slide rails 12. In other words, first, as shown in FIG. 6 and FIGS. 14 to 16, the slider 13 is positioned at the lower end side of the slide rails 12 in a state of an initial position where the table 2 is dropped into the storage position P1. In this state, the slide rails 12 is in a state where the movable side rail 12B is dropped into the lowermost position where an arrangement thereof being overlapped with the fixed side rail 12A and is in a state where both the movable side rail 12B and the fixed side rail 12A are arranged at a position lower than the upper surface of the armrest 103 as shown in FIG. 6. In addition, the table 2 is also in a state of being largely dropped downward to be approximately flush with the upper surface of the armrest 103.

Figure 7:
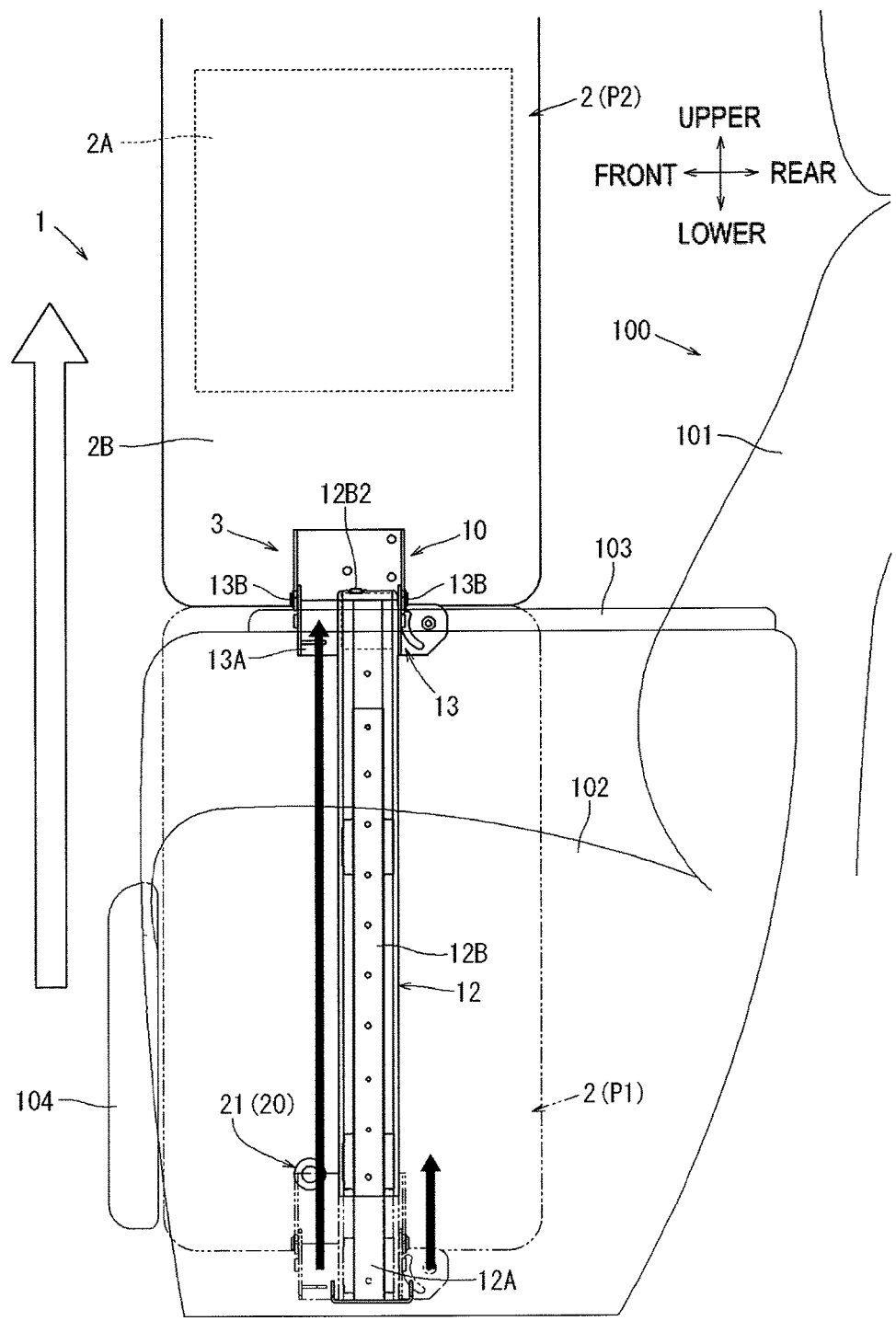
FIG. 7 is a side view illustrating a state where the table is pulled up to an upper side of the armrest.
Figure 8:
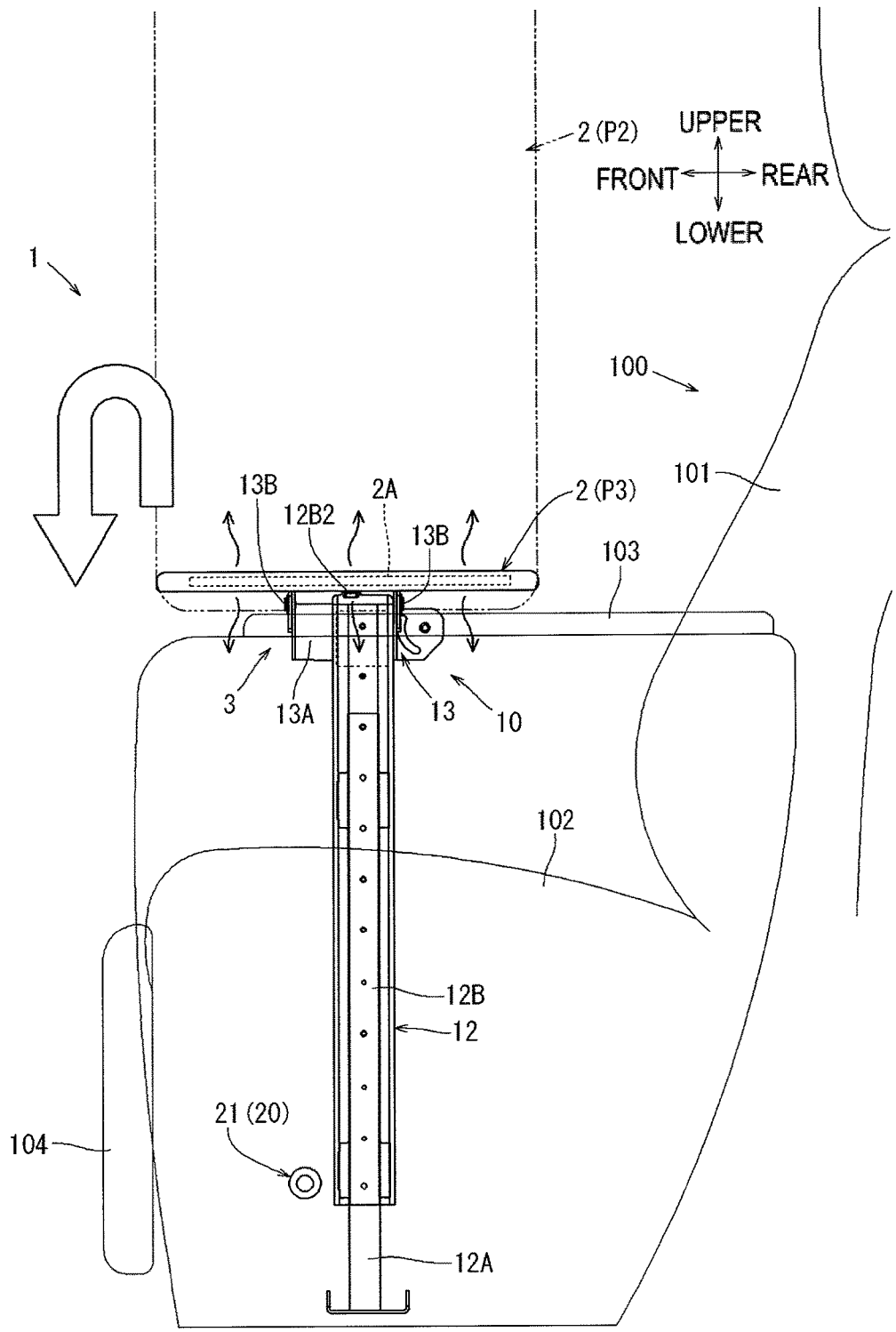
FIG. 8 is a side view illustrating a state where the table is turned down to the upper side of the knees of the seated person to be deployed.
Figure 17:
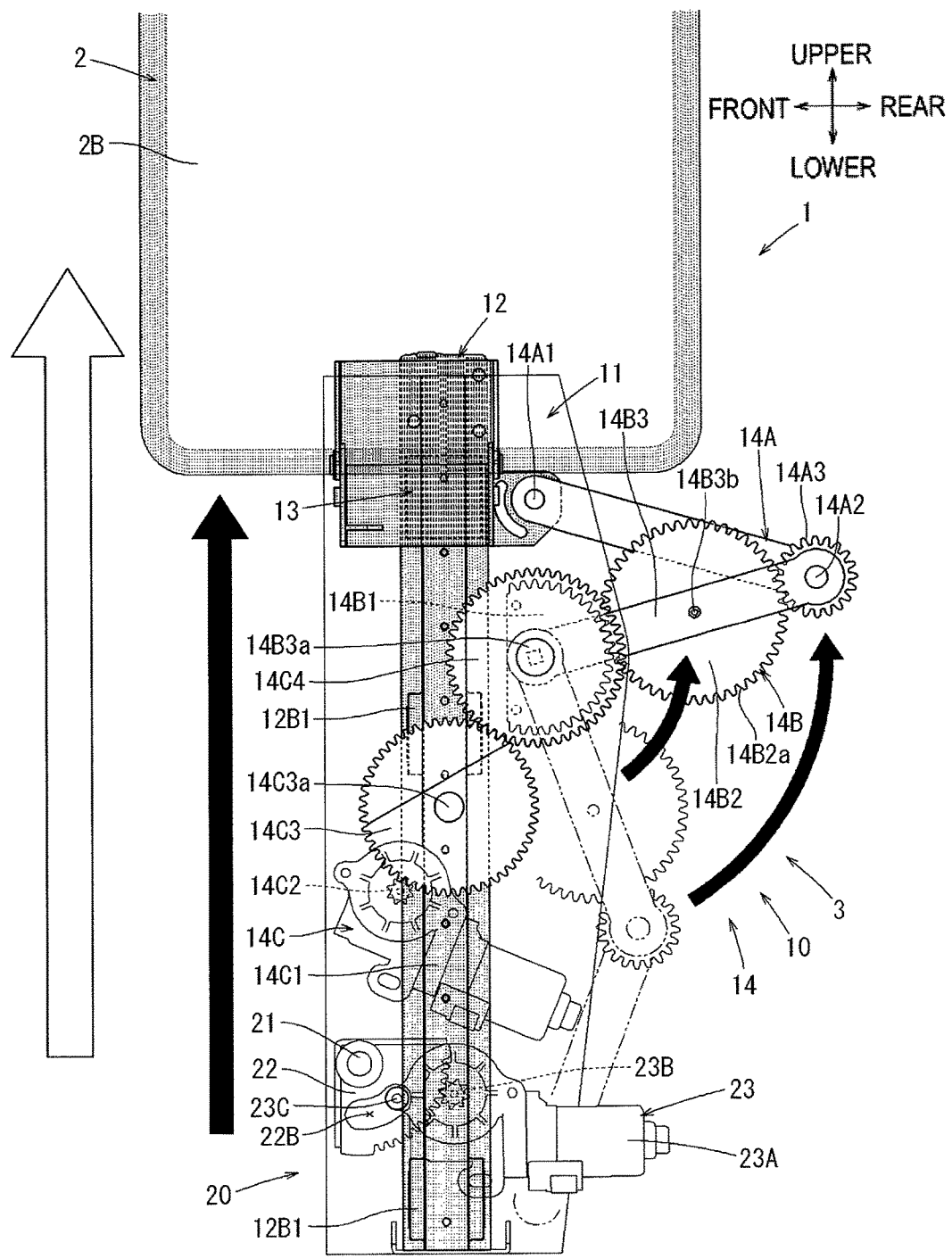
FIG. 17 is a side view illustrating a state where a slider reaches an upper end of a movable side rail by pulling up the table.

In the above-described state, as the slider 13 is pulled upward by the operation of the feed mechanism 14 described below as shown in FIG. 17, the slider 13 moves upward along the movable side rail 12B. As the slider 13 is pulled upward to a position where the slider 13 contacts the upper end of the movable side rail 12B to be locked, the slider 13 is further pulled upward from the above state, which causes a movement. Accordingly, the movable side rail 12B slides upward with respect to the fixed side rail 12A in a manner of being lifted by the slider 13 as shown in FIG. 18. As shown in FIG. 7, with the sliding movement, the slider 13 and the movable side rail 12B are in a state of being pulled up to a position higher than the upper surface of the armrest 103, and even if the table 2 is laterally pushed down at the position as shown in FIG. 8, the table 2 can be dropped horizontally without being obstructed by the armrest 103.

When attempting to laterally push down the table 2 before the slider 13 is pulled up to the height position as shown in FIG. 7, the table 2 contacts an upper end of the movable side rail 12B so that the movement of turning down is obstructed halfway. However, since the upper end of the movable side rail 12B which contacts the table 2 is the roller 12B2, by pulling up the slider 13 to the height position shown in FIG. 7 while the table 2 is being deployed halfway as above, the table 2 is guided so as to be dropped into a position to be gradually and smoothly horizontal resulting from sliding rotation of the roller 12B2.

In addition, a movement in which the slider 13 is dropped from the height position shown in FIG. 7 towards the initial position shown in FIG. 6, causes the movable side rail 12B to drop in together with the slider 13 and return to a state where the arrangement thereof is overlapped with the fixed side rail 12A. In such cases, even if the slider 13 is dropped while the table 2 remains horizontally deployed, the table 2 is gradually and smoothly raised up by contacting the roller 12B2 provided at the upper end of the movable side rail 12B so that the table 2 can be dropped into the storage position P1 in a manner of being returned to the erected state.

As shown in FIGS. 11 to 15, the feed mechanism 14 includes an operation link 14A which is connected to the slider 13 and operated to move the slider 13 in the seat height direction by rotation, a planetary gear mechanism 14B which is connected to the operation link 14A and operated to move the operation link 14A in the seat height direction by rotation, and a drive unit 14C which transfers rotational driving force to the operation link 14A and the planetary gear mechanism 14B.

Figure 14:
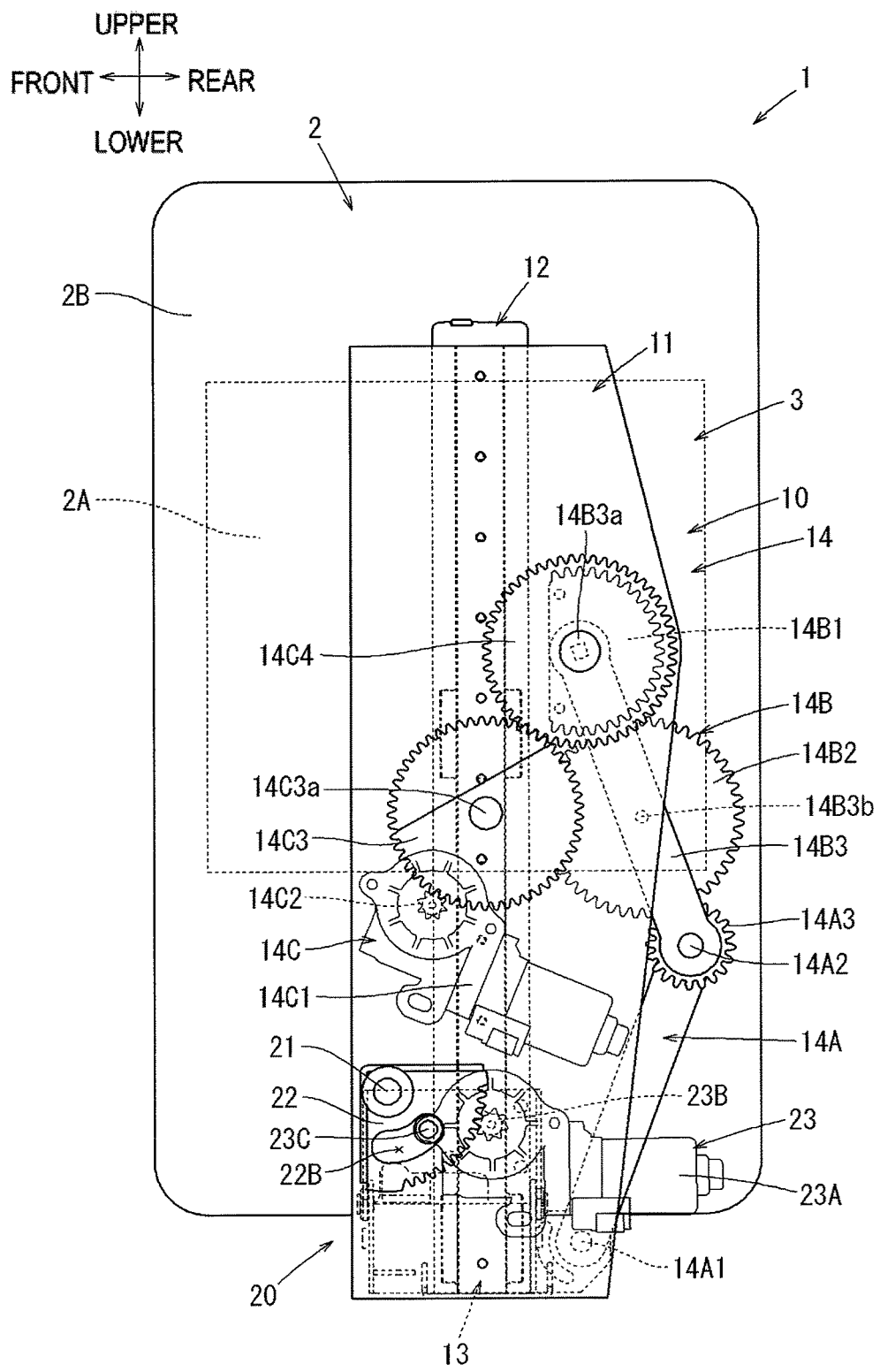
FIG. 14 is a side view of the table moving mechanism.
Figure 15:
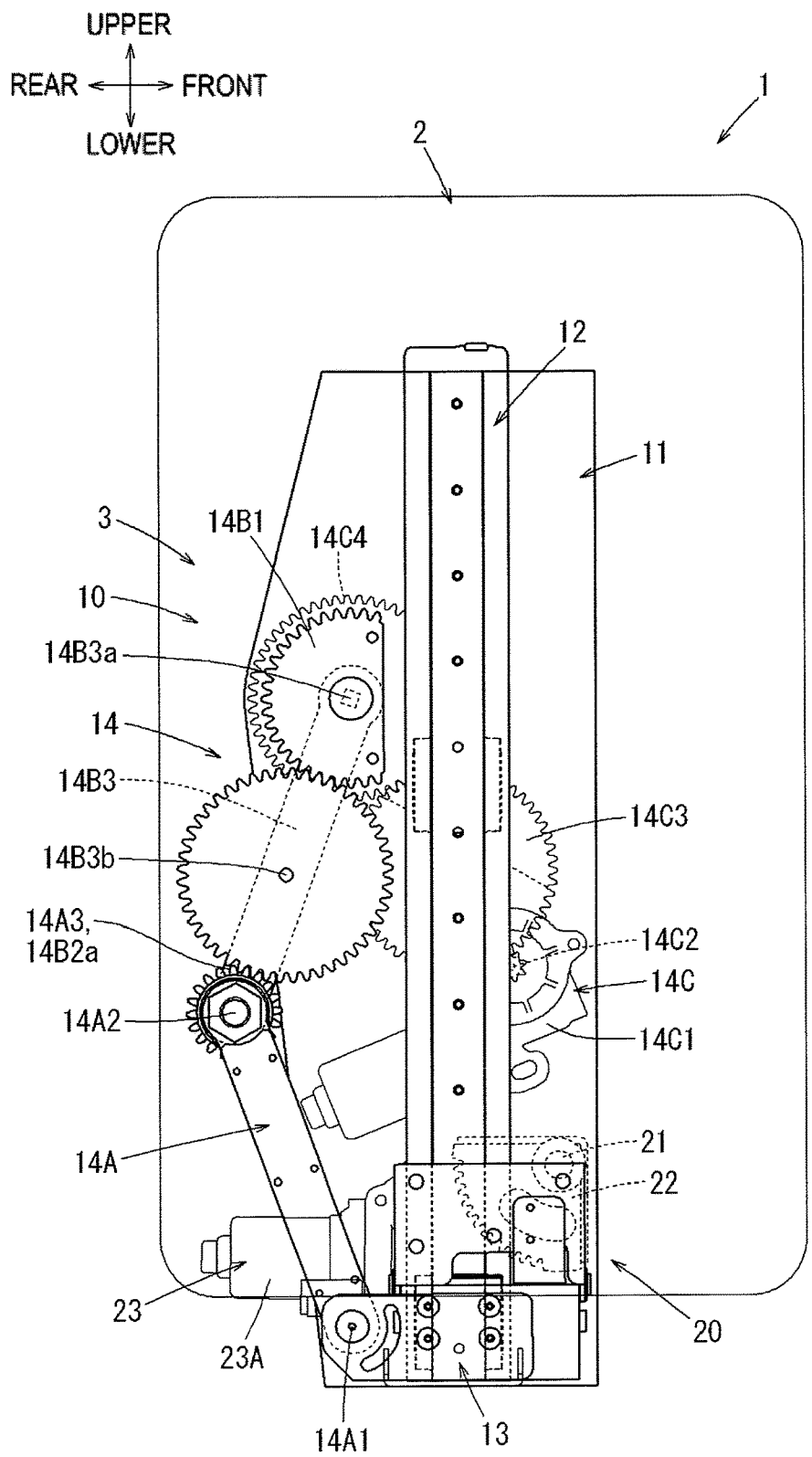
FIG. 15 is a side view as viewed from an opposite side to the side in FIG. 14.

As shown in FIGS. 12 to 15, the operation link 14A is provided in a direction extending in the seat height direction in an initial state, and a lower end thereof is rotatably shaft-connected to the slider 13 by a connecting shaft 14A1 in which the axis is directed to the seat width direction. As shown in FIGS. 13 to 15, the operation link 14A is in a state where an upper end thereof is rotatably shaft-connected to a lower end of an articulated link 14B3 of the planetary gear mechanism 14B described below by a support shaft 14A2 in which the axis is directed to the seat width direction and is rotatably connected to the base plate 11 via the articulated link 14B3. A spur gear shaped tooth surface 14A3 which is formed around the support shaft 14A2 is integrally formed at the upper end of the operation link 14A.

As shown in FIGS. 13 to 15, the planetary gear mechanism 14B includes a sun gear 14B1 formed in an approximately semicircular plate shape and integrally attached to the base plate 11, a planetary gear 14B2 meshed with a tooth surface 14B1a on an outer peripheral side of the sun gear 14B1, and the articulated link 14B3 connecting both so that the planetary gear 14B2 is operated to change a meshing position with and also revolve around a periphery of the sun gear 14B1. As shown in FIGS. 14 to 15, the sun gear 14B1 is arranged in a region on a rear side of the slide rails 12, and is in a state where only a cut-out which is cut into the approximately semicircular plate-shape is integrally attached to the base plate 11 at an approximate position close to the slide rails 12 from the rear side.

The planetary gear 14B2 is formed in a spur gear shape having a larger rotation radius than the sun gear 14B1, and a tooth surface 14B2a is endlessly formed along an entire outer peripheral surface of the planetary gear 14B2. The articulated link 14B3 includes approximately the same link length as the operation link 14A and is provided in a direction extending in the seat height direction similarly to the operation link 14A in the initial state. The articulated link 14B3 is configured that the lower end thereof is rotatably shaft-connected to the upper end of the operation link 14A by the support shaft 14A2, the upper end thereof is rotatably shaft-connected to the base plate 11 through a central shaft portion of the sun gear 14B1 by a base shaft 14B3a parallel to the support shaft 14A2, and a central shaft portion of the planetary gear 14B2 is rotatably shaft-connected to an intermediate portion in a link length direction of the articulated link 14B3 by a shaft pin 14B3b parallel to the support shaft 14A2.

With a connection via the articulated link 14B3, the tooth surface 14B2a of the planetary gear 14B2 is assembled in a manner of be being meshed with the tooth surface 14B1a of the sun gear 14B1 and the tooth surface 14A3 formed around the support shaft 14A2 of the operation link 14A respectively. More specifically, the sun gear 14B1, the planetary gear 14B2, and the support shaft 14A2 of the operation link 14A are assembled in a state of being in a position aligned with and meshed with one another by the connection via the articulated link 14B3. As shown in FIG. 16, in a state of the initial position where the slider 13 is positioned on the lower end side of the slide rails 12, the planetary gear mechanism 14B is held in a posture state where the operation link 14A and the articulated link 14B3 are extending in the seat height direction with forming a bent shape into a shape of a greater-than sign (>) slightly backwards to each other.

As shown in FIG. 17, the planetary gear mechanism 14B is operated to move from an initial position state as follows. The articulated link 14B3 is rotationally operated to be raised in a counterclockwise direction in FIG. 17 around the base shaft 14B3a at an upper end side by rotational driving force output from the drive unit 14C described below. As a result of the rotation, the planetary gear 14B2 subsequently rotates around the sun gear 14B1 in the counterclockwise direction in FIG. 17 and also revolves to be moved, as well as the support shaft 14A2 of the operation link 14A is also lifted in the same direction. With the above operation, the support shaft 14A2 of the operation link 14A is lifted to a higher position resulting from a rotation of the articulated link 14B3, and meanwhile, the tooth surface 14A3 around the support shaft 14A2 rotates the operation link 14A around the support shaft 14A2 in the clockwise direction in FIG. 17 in a manner of changing the meshing position with the tooth surface 14B2a of the planetary gear 14B2 resulting from the rotation in the counterclockwise direction in FIG. 17 of the meshed planetary gear 14B2.

Further, with the above operation, the slider 13 connected to a lower end of the operation link 14A is operated to move so as to be pulled upward along the slide rails 12. As a result of driving rotation of the articulated link 14B3, the operation link 14A is rotationally operated so as to extend beyond the base shaft 14B3a being a rotation center of the articulated link 14B3 and to be pulled up to a position being in a rotation posture extending upward together with the articulated link 14B3 as shown in FIG. 18. With the above rotation operation, the slider 13 is operated so as to move largely in the seat height direction from the initial position as shown in FIG. 16 to the overrun position extending beyond the upper end of the fixed side rail 12A as shown in FIG. 18 with extending beyond the link length of the operation link 14.

In such cases, as shown in FIG. 16, the articulated link 14B3 connected to the planetary gear 14B2 is to be rotated from a rotation angle extending from the base shaft 14B3a at the center of the sun gear 14B1 towards the downside rather than the horizontal direction to a rotation angle in which the articulated link 14B3 extend beyond the horizontal posture and becomes upright as shown in FIG. 18. Therefore, the slider 13 is to be moved so as to be pulled up respectively at a comparatively slow speed in each region of the start of pulling-up as shown in FIG. 16 and the end of pulling-up as shown in FIG. 18 while to be pulled up at a relatively high speed in regions in between.

As shown in FIG. 11 and FIGS. 13 to 14, the drive unit 14C includes an electrically driven motor 14C1, a pinion 14C2 connected to an output shaft of the motor 14C1, a first spur gear 14C3 meshed with the pinion 14C2, and a second spur gear 14C4 meshed with the first spur gear 14C3. The motor 14C1 is provided to be integrally attached to the base plate 11. The pinion 14C2 is directly connected to the output shaft of the motor 14C1 to be operated to rotate in both forward and reverse directions around the axis extending in the seat width direction resulting from driving rotation of the motor 14C1.

The first spur gear 14C3 is arranged at a position at the upper side than the pinion 14C2, and the central shaft portion thereof is rotatably shaft-connected to the base plate 11 by a shaft pin 14C3a in which the axis is directed to the seat width direction. The second spur gear 14C4 is arranged at a position at the upper side than the first spur gear 14C3, and the base shaft 14B3a being the rotation center of the articulated link 14B3 is integrally connected to the central shaft portion of the second spur gear 14C4 so as to be rotatably shaft-connected to the base plate 11. The base shaft 14B3a is integrally connected to the central shaft portion of the second spur gear 14C4 and the upper end of the articulated link 14B3 respectively, and both are integrally connected to each other.

When the driving of the motor 14C1 is stopped, the drive unit 14C with the above-described configuration holds with the braking force, in a state where the rotation of the planetary gear mechanism 14B or the operation link 14A remains stopped. In the drive unit 14C, the motor 14C1 is driven and rotated in either forward or reverse direction, which causes the rotational driving force to be transferred from the first spur gear 14C3 to the second spur gear 14C4 via the pinion 14C2, and accordingly the articulated link 14B3 integrally connected to the second spur gear 14C4 is driven and rotated in the corresponding rotation direction around the base shaft 14B3a.

Configuration of Front-Rear Rotation Mechanism 20

Next, a specific configuration of the front-rear rotation mechanism 20 will be described. As shown in FIG. 11 and FIGS. 13 to 14, the front-rear rotation mechanism 20 includes the rotary shaft 21 in which the axis is directed to the seat width direction and a portion of a front lower side of the base plate 11 is rotatably shaft-connected to the right side portion of the right armrest 103 as illustrated in FIG. 1, a sector gear 22 integrally coupled to the base plate 11, and a drive unit 23 transferring the rotational driving force to the sector gear 22.

The rotary shaft 21 is integrally connected to the base plate 11, and is rotatably shaft-connected to the right side portion of the right armrest 103. The sector gear 22 is formed in an approximately sector-shape protruding rearwardly and downwardly and having an outer peripheral surface in an arc shape drawn around the rotary shaft 21, and a tooth surface 22A formed along the outer peripheral surface of the sector-shape is assembled in a state of being meshed with a pinion 23B of the drive unit 23 described below. The sector gear 22 is formed with a long hole 22B penetrating in an arc shape drawn around the rotary shaft 21.

As shown in FIGS. 13 to 14, the drive unit 23 includes an electrically driven motor 23A, the pinion 23B connected to an output shaft of the motor 23A, and a regulating pin 23C extending from the motor 23A to a right side (seat width direction) to be fitted into the long hole 22B of the sector gear 22. The motor 23A is provided to be integrally attached to the right side portion of the right armrest 103 as illustrated in FIG. 1. The pinion 23B is directly connected to the output shaft of the motor 23A and holds with the braking force, in a state where the rotation of the meshed sector gear 22 therewith remains stopped when the driving of the motor 23A is stopped. The motor 23A is driven and rotated, which causes the pinion 23B to be rotated in both forward and reverse directions around the axis extending in the seat width direction.

Figure 19:
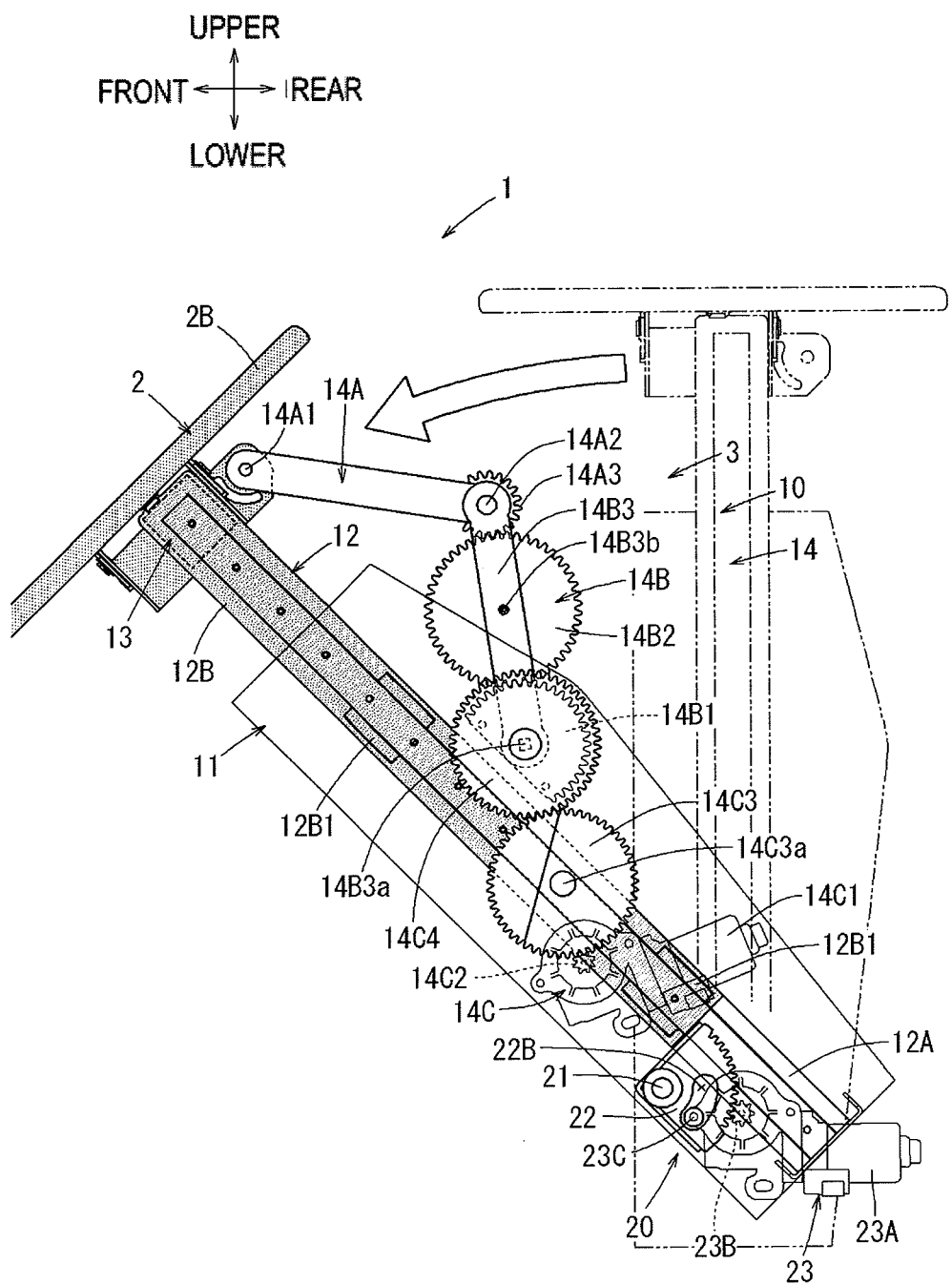
FIG. 19 is a side view illustrating a state where the deployed table is turned down to the front side around a shaft center.

With the above rotation operation, the pinion 23B feeds and moves the meshed sector gear 22 therewith in the corresponding rotational direction, which causes the table 2 connected via the base plate 11 to be rotated and returned in a manner of being tilted forward about the rotary shaft 21, as shown in FIG. 19. As a result of driving rotation of the motor 23A, a rotational movement of the table 2 in the seat front-rear direction around the rotary shaft 21 is stopped respectively at each position where the regulating pin 23C extending from the motor 23A contacts one end or the other end of the long hole 22B of the sector gear 22 to be locked. The locking position is set to a rotation position where the table 2 is in the deployed position P3 shown in FIG. 8 and a rotation position where the table 2 is in the forward tilting position P4 shown in FIG. 9 respectively.

Summary

To summarize the above, the table apparatus 1 according to the embodiment is configured as follows. That is, a table apparatus for a vehicle (1) includes: a table (2) having a substantially horizontal upper surface in a region directly above a seating surface (102) of a vehicle seat (100); a heat source (2A) provided to the table (2) to perform heat radiation from a lower surface side of the table (2); and a table moving mechanism (3) configured to move the table (2) so as to change a position of the table (2) with respect to the vehicle seat (100), wherein a position of the heat source (2A) with respect to the vehicle seat (100) is changed by moving the table (2) by the table moving mechanism (3).

With such a configuration, by changing the position of the table (2) with respect to the vehicle seat (100) by the table moving mechanism (3), it is possible to change the position of the heat source (2A) which performs the heat radiation from the lower surface side of the table (2). In this way, by using the mechanism for moving the table (2), it is possible to appropriately change the use position of the heat source (2A) attached to the table (2) by moving the table (2) for a purpose different from the purpose for changing the use position of the table (2).

In addition, the table moving mechanism (3) includes: an upper-lower movement mechanism (10) configured to change the position of the table (2) in the height direction with respect to the vehicle seat (100); and a front-rear movement mechanism (20) configured to change the position of the table (2) in a front-rear direction with respect to the vehicle seat (100). With such a configuration, by changing the position of the table (2) in the height direction by the upper-lower movement mechanism (10), it is possible to change a position of the heat source (2A) in the height direction so as to be away from or close to the position depending on the condition such as a physique, posture, and preference of the seated person. In addition, by changing the position of the table (2) in the front-rear direction by the front-rear movement mechanism (20), it is possible to change the position of the heat source (2A) in the front-rear direction depending on the condition such as the physique, posture, and preference of the seated person.

In addition, the table moving mechanism (3) includes a front-rear rotation mechanism (20) configured to change the position of the table (2) in the front-rear direction with respect to the vehicle seat (100) by rotating around the shaft center (21) which extends in a seat width direction and is set at a position lower than the table (2). With such a configuration, by the front-rear rotation mechanism (20), the lower surface of the table (2) can be moved on a rotation trajectory along the thigh portions or the lower leg portions of the seated person. Therefore, it is possible to move the use position of the heat source (2A) which performs the heat radiation from the lower surface side of the table (2) to be along the thigh portions or the lower leg portions of the seated person.

In addition, the table apparatus for a vehicle (1) further includes a movable armrest (103) provided on a side portion of the vehicle seat (100) and configured to change a position thereof in a height direction, wherein the table moving mechanism (3) is attached to the movable armrest (103) and is configured to change the position of the table (2) with respect to the movable armrest (103). With such a configuration, by using the upper-lower movement of the armrest (103), the table (2) can be moved up and down with respect to the vehicle seat (100) without changing the position in the height direction with respect to the armrest (103).

In addition, the heat source (2A) is configured to perform the heat radiation also from the upper surface of the table (2). With such a configuration, by using the heat source (2A) which performs the heat radiation from the lower surface side of the table (2), the heat radiation can be also performed efficiently from the upper surface side of the table (2).

As mentioned above, although the aspects of the disclosure have been described by using one embodiment, the disclosure can be implemented in various forms other than the above embodiments. For example, the table apparatus for a vehicle of the disclosure can be used for various vehicles such as cars other than automobiles such as trains, aircraft and ships. In addition, the heat source which performs the heat radiation from the lower surface side of the table may be a cooling appliance in addition to a heating appliance such as a panel heater. The heat source may be configured to be externally attached to the table in addition to being embedded in the table.

The table moving mechanism may be configured to move the table in the front-rear direction only or in the height direction only. The movement of the table in the front-rear direction by the table moving mechanism may be a linear movement in addition to a rotational movement. In addition to be the movable armrest of the vehicle seat, the table moving mechanism may also be connected to the side of the seat cushion or to the vehicle floor to move the table with respect to the seat cushion and the floor.

What is claimed is:

1. A seat and table apparatus for a vehicle, the apparatus comprising:
   a vehicle seat;
   a table having a substantially horizontal upper surface in a region directly above a seating surface of the vehicle seat;
   a heat source provided to the table and configured to perform heat radiation from a lower surface side of the table;
   a table moving mechanism configured to move the table so as to change a position of the table with respect to the vehicle seat,
   a position of the heat source with respect to the vehicle seat being changed by moving the table by the table moving mechanism,
   a movable armrest provided on a side portion of the vehicle seat and configured to change a position thereof in a height direction, and
   the table moving mechanism being attached to the movable armrest and configured to change the position of the table with respect to the movable armrest.

2. The seat and table apparatus for a vehicle according to claim 1,
   wherein the table moving mechanism includes:
      an upper-lower movement mechanism configured to change the position of the table in a height direction with respect to the vehicle seat; and
      a front-rear movement mechanism configured to change the position of the table in a front-rear direction with respect to the vehicle seat.

3. The seat and table apparatus for a vehicle according to claim 1,
   wherein the table moving mechanism includes a front-rear rotation mechanism configured to change the position of the table in the front-rear direction with respect to the vehicle seat by rotating around a shaft center which extends in a seat width direction and is set at a position lower than the table.

4. The seat and table apparatus for a vehicle according to claim 1,
   wherein the heat source is configured to perform the heat radiation also from the upper surface of the table.

* * * * *